United States Patent
Ansari

(10) Patent No.: US 7,313,794 B1
(45) Date of Patent: Dec. 25, 2007

(54) METHOD AND APPARATUS FOR SYNCHRONIZATION OF SHARED MEMORY IN A MULTIPROCESSOR SYSTEM

(75) Inventor: Ahmad R. Ansari, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 785 days.

(21) Appl. No.: 10/354,813

(22) Filed: Jan. 30, 2003

(51) Int. Cl.
*G06F 9/46* (2006.01)
*G06F 13/00* (2006.01)

(52) U.S. Cl. .................................... 718/102; 710/108
(58) Field of Classification Search ................ 718/104, 718/102; 710/241, 108
See application file for complete search history.

(56) References Cited

U.S. PATENT DOCUMENTS 5,050,072 A * 9/1991 Earnshaw et al. .......... 710/108
5,790,851 A * 8/1998 Frank et al. ................ 718/104
6,105,099 A * 8/2000 Freitas et al. .............. 710/200
6,353,869 B1 * 3/2002 Ofer et al. .................. 710/200
6,892,258 B1 * 5/2005 Williams et al. ........... 710/241

OTHER PUBLICATIONS

A Word Definition From the Webopedia Computer Dictionary.*

* cited by examiner

*Primary Examiner*—Meng-Al T. An
*Assistant Examiner*—Camquy Truong
(74) *Attorney, Agent, or Firm*—W. Eric Webostad

(57) ABSTRACT

Method and apparatus for synchronizing access to a memory shared among a plurality of processors is described. In one example, each of the plurality of processors includes a primary bus for communicating with the memory and a secondary bus. A synchronization block is coupled to the secondary bus of each of the plurality of processors. The synchronization block includes at least one semaphore for controlling access among the plurality of processors to at least one data segment stored within the memory.

27 Claims, 6 Drawing Sheets

METHOD AND APPARATUS FOR SYNCHRONIZATION OF SHARED MEMORY IN A MULTIPROCESSOR SYSTEM

FIELD OF THE INVENTION

One or more aspects of the present invention relate generally to data processing systems and, more particularly, to synchronization of a shared memory in a multiprocessor system.

BACKGROUND OF THE INVENTION

In a data processing system, if more than one process requires access to shared data, a synchronization mechanism is used to coordinate access to the shared data among the different processes. The synchronization mechanism is necessary to prevent one process from modifying the shared data before another process has finished working with the shared data. Synchronization of shared data becomes more complex if the multiple processes run on physically distinct processors in a multiprocessor system that accesses the shared data from a shared memory.

In general, to achieve synchronization of shared data, lock variables, known as semaphores, are used to coordinate access to the shared data among processes. A semaphore is a flag stored in shared memory that is accessible by the processes. If a process accesses and locks a semaphore associated with a segment of shared data, no other process is allowed to access that segment of shared data.

More specifically, a process reads a semaphore associated with a particular segment of shared data to test semaphore state. If the semaphore contains a value of '0', associated shared data is free, and if the semaphore contains a value of '1', associated shared data is locked. The process keeps reading and testing the state of the semaphore until the value of the semaphore indicates that the lock on the associated segment of shared data is free. This continuous reading and testing of the semaphore is known as spin-waiting. If the semaphore indicates the lock is free, the process then races against other processes that were similarly spin-waiting to lock the associated segment of shared data.

Conventionally, a processor uses an atomic swap instruction that both reads semaphore value and stores a '1' into the semaphore to lock an associated segment of shared data in a single step. The process that wins access to the shared data will read a '0' from the semaphore, while the losing process (es) will read a '1' from the semaphore. The winning process then uses the shared data and stores a '0' into the associated semaphore when finished with the shared data.

Some processors, however, do not support atomic read-modify-write or atomic swap operations. In a data processing system having more than one of such processors where each may execute more than one process, semaphores stored in a shared memory are conventionally not sufficient to be used to reliably control access to shared data within the shared memory.

Accordingly, it would be both desirable and useful to provide method and apparatus for synchronization of a shared memory in a multiprocessor system that overcomes one or more above-described limitations associated with semaphores stored in shared memory.

SUMMARY OF THE INVENTION

Method and apparatus for synchronizing access to a memory shared among a plurality of processors is described. In an embodiment, each of the plurality of processors includes a primary bus for communicating with the memory and a secondary bus. A synchronization block is coupled to the secondary bus of each of the plurality of processors. The secondary bus comprises, for example, a device control register bus. The synchronization block includes at least one semaphore for controlling access among the plurality of processors to at least one data segment stored within the memory. In an embodiment, the at least one semaphore includes an arbitration circuit and a plurality of registers. In another embodiment, the plurality of processors are embedded within a programmable logic device and the synchronization block if formed via programmed configurable logic blocks within the programmable logic device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for synchronization of shared memory in a multiprocessor system is described. One or more aspects in accordance with the invention are described in terms of multiple processors embedded within a programmable logic device (PLD), such as a field programmable gate array (FPGA). While specific reference is made to multiple processors embedded within a PLD, those skilled in the art will appreciate that one or more aspects of the invention may be used in other data processing systems having multiple processors accessing a shared memory, such as multiple processors embedded within an application specific integrated circuit (ASIC), application specific standard product (ASSP), or a plurality of discrete processors.

Figure 1:
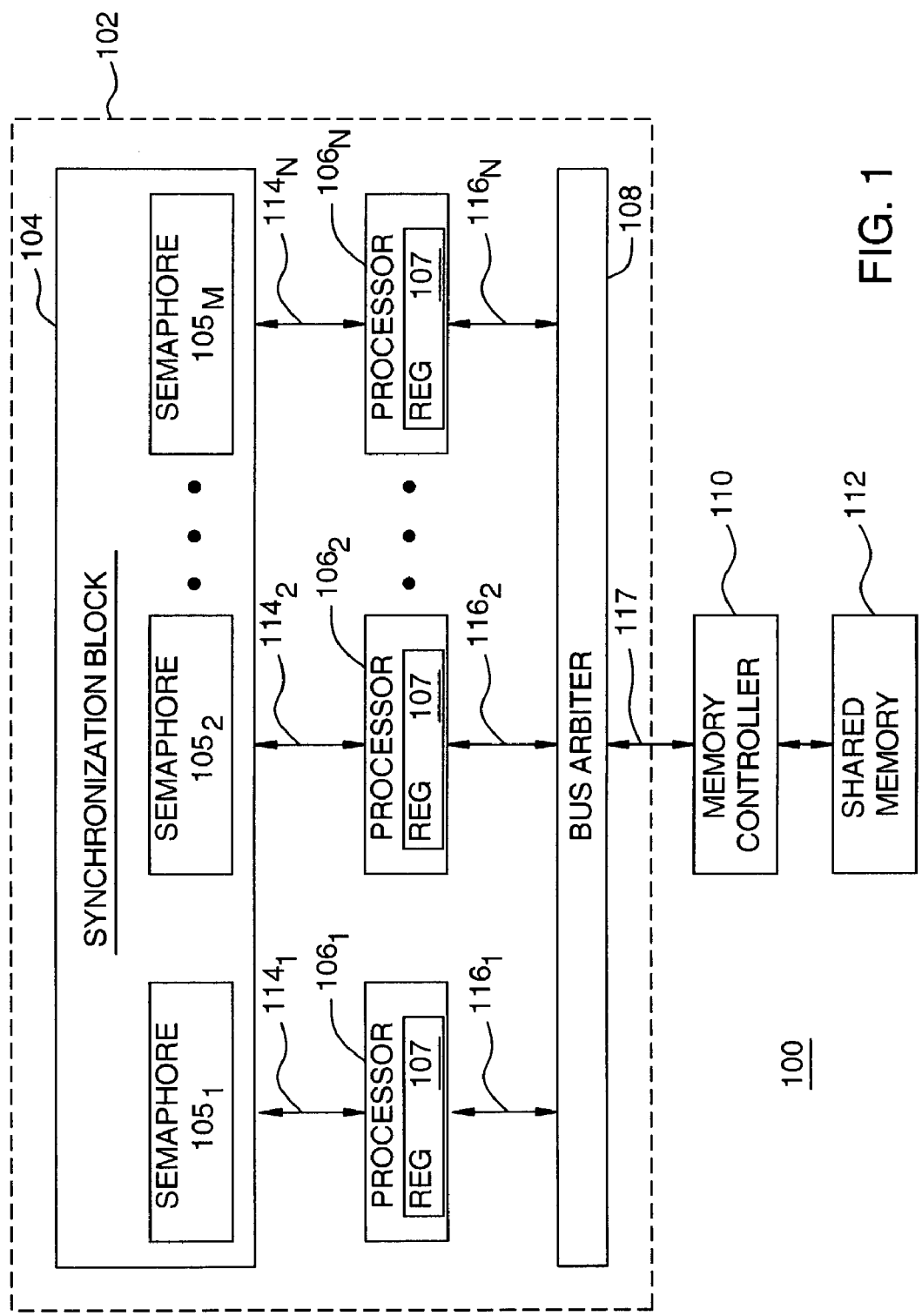
FIG. 1 depicts a high-level block diagram of an exemplary embodiment of a data processing system in accordance with one or more aspects of the invention.

FIG. 1 depicts a high-level block diagram of an exemplary embodiment of a data processing system 100 in accordance with one or more aspects of the invention. Data processing system 100 includes an FPGA 102, a memory controller 110, and a shared memory 112. FPGA 102 includes a plurality of processors $106_1$ through $106_N$ (collectively referred to as processors 106), a synchronization block 104, buses $114_1$ through $114_N$ (collectively referred to as buses 114), buses $116_1$ through $116_N$ (collectively referred to as buses 116), bus 117, and a bus arbiter 108. Though more than two processors 106, buses 114, and buses 116 are shown, it should be appreciated that FPGA 102 includes at least two processors 106, at least two buses 114, and at least two buses 116. As such N is an integer equal to or greater than two. Furthermore, as is well known, processors conventionally include general-purpose registers, such as general-purpose registers $107_1$ through $107_N$ (collectively referred to as general-purpose registers 107).

Synchronization block 104 includes a plurality of semaphores $105_1$ through $105_M$ (collectively referred to as semaphores 105). Though more than two semaphores 105 are shown, it should be appreciated that the number of semaphores in use depends on the number of processes running. Each of semaphores 105 acts as a flag or lock for a shared data segment to synchronize access to that shared data segment. Since two different shared data segments do not require synchronization with respect to each other, two separate semaphores are used, one for each shared data segment. Each, or a subset, of processors 106 is coupled to bus arbiter 108 via memory access ("main") buses 116 and is coupled to synchronization block 104 via semaphore access ("secondary") buses 114. Bus arbiter 108 is coupled to access shared memory 112 via a shared bus 117, as controlled through memory controller 110, which is coupled to shared memory 112.

For purposes of clarity, FPGA 102 may be considered as a system-on-a-chip (SoC), where processors 106 are embedded processor cores within FPGA 102. Synchronization block 104 is formed by programming configurable logic blocks within FPGA 102 or by providing dedicated-embedded circuitry within FPGA 102 or a combination of both. As described in more detail below, semaphores 105 include registers for storing a lock variable. For purposes of clarity by example, secondary buses 114 are described as a device control register (DCR) buses, and thus processors 106 are of a type having a DCR bus interface. For example, processors 106 may be IBM Power PC cores. However, it should be appreciated that other known-processor cores and buses may be used, such as either Intel Pentium or AMD Athlon processors with memory access via at least one of a Front-Side Bus and a Peripheral Component Interconnect (PCI) Bus, as well as more classic Intel and AMD processors with direct memory interfaces.

Shared memory 112 comprises read/write memory. Though shared memory 112 conventionally is random access memory (RAM), such as synchronous-dynamic-RAM (SDRAM), including double-data-rate (DDR) SDRAM, Rambus-dynamic-RAM (RDRAM). Although memory controller 110 and shared memory 112 are shown as discrete elements, those skilled in the art will appreciate that one or both of memory controller 110 and shared memory 112 may be embedded circuitry within FPGA 102. Furthermore, conventionally memory controller 110 and shared memory 112 are provided together as part of a memory module, such as a single-inline memory module (SIMM) or a dual-inline memory module (DIMM).

In operation, processors 106 communicate with shared memory 112 via main buses 116 and shared bus 117. In particular, processors 106 communicate with bus arbiter 108, which controls access to memory controller 110 among processors 106 in a well-known manner. Memory controller 110 in turn controls access to shared memory 112 in a well-known manner. Shared memory 112 stores segments of shared data for use by processes executed by processors 106.

Furthermore, information may be fetched, including prefetched, from bulk storage memory, such as a disc drive, into shared memory 112, where such information may be multiple segments in bulk storage, such as multiple blocks, but be stored as a single segment, such as continuous address space, in circuit memory. Access to the segments of shared data stored within shared memory 112 is controlled via semaphores 105 within synchronization block 104. Each of Semaphores 105 is associated with a piece of shared data if each of semaphores 105 is allocated to a processes running on one of processors 106. Semaphores 105 will lock out other processes running on any of processors 106, preventing access to the shared data respectively associated with semaphores 105.

In particular, semaphores 105 are available for association with a particular segment or segments (segment(s)) of shared data within shared memory 112. Semaphores 105 indicate whether segment(s) of shared data are locked or unlocked. Semaphores 105 are associated with segment(s) of shared data by an operating system (OS) running on processors 106. A value of '1' stored within one of semaphores 105 indicates that at least one respective segment of shared data is locked and only accessible by a respective one of processors 106 that obtained such a lock. Conversely, a value of '0' stored within one of semaphores 105 indicates that at least one respective segment of shared data is unlocked, and thus is available to be locked for access by any one of processors 106. For clarity, locking of a single segment of data is described, as it will be understood that multiple data segments or address space ranges may be locked out by a single semaphore.

Processors 106 send read and write instructions to synchronization block 104 via secondary bus 114. For example, if secondary bus 114 is a DCR bus, a read instruction may include a MOVE-FROM-DCR instruction and a write instruction may include a MOVE-TO-DCR instruction. Processors 106 send read instructions to synchronization block 104 to lock a particular segment of shared data within shared memory 112 for access. To lock a segment of shared data, synchronization block 104 reads the value of an associated one of semaphores 105. If the value indicates the segment of shared data is unlocked, synchronization block 104 changes the value to indicate that the segment of shared data is now locked and returns the value. If, however, the value indicates that the segment of shared data is already locked, synchronization block 104 does not return a value. Alternatively, synchronization block 104 may return a value indicating the segment of shared data is already locked. To unlock a segment of shared data within shared memory 112, processors 106 send write instructions to synchronization block 104. In response to a write instruction, synchronization block 104 changes the value of an associated one of semaphores 105 to indicate the segment of shared data is unlocked.

For example, the following process is performed when processor $106_X$ requires access to a segment of shared data associated with semaphore $105_Y$, where X is an integer between 1 and N, and Y is an integer between 1 and M. Before processor $106_X$ accesses the segment of shared data, processor $106_X$ attempts to lock the segment of shared data. Processor $106_X$ issues a read instruction on secondary bus 114 in order to determine if the shared data segment is currently unlocked and accessible. If the value of semaphore $105_Y$ is '0' (indicating that the lock is free), a '1' is stored within semaphore $105_Y$ and a '1' is returned to processor $106_X$ on secondary bus 114. Having locked access to the segment of shared data, processor $106_X$ updates the segment of shared data via main bus 116. Once processor $106_X$ is finished with the segment of shared data, processor $106_X$ issues a write instruction on secondary bus 114 to unlock the segment of shared data. A '0' is then stored within semaphore circuit $105_Y$.

If processor $106_X$ attempts to read the value of semaphore $105_Y$ and the value of semaphore $105_Y$ is '1' (indicating that the lock is not free), no operation is performed on semaphore $105_Y$. In an embodiment, processor 106×does not receive a return value from synchronization block 104 on secondary bus 114 and the read instruction times out. In an alternative embodiment, synchronization block 104 may return a '0' to processor $106_X$ on secondary bus 114, indicating that the segment of shared data is already locked by another of processors 106. In either embodiment (i.e., waiting or busy), processor $106_X$ will spin wait by continuing to attempt to lock the segment of shared data as described above. Alternatively, synchronization block 104 may queue the lock attempt by processor $106_X$ and processor $106_X$ may enter a wait state. When semaphore $105_Y$ is free, synchronization block 104 sends an interrupt to processor $106_X$, causing processor $106_X$ to attempt to lock the segment of shared data.

In accordance with one or more aspects of the invention, a memory synchronization mechanism is provided for processors that do not support atomic swap or atomic read/modify/write instructions on the main bus. Since such processors cannot read and write a value to memory with a single instruction (i.e., atomically), semaphores for synchronizing access to a shared memory cannot be stored within the shared memory. Since the invention provides semaphores within a synchronization block coupled to a secondary bus, such as a DCR bus, which is accessible by all of the processors, processors that do not support atomic instructions may be used.

Figure 4:
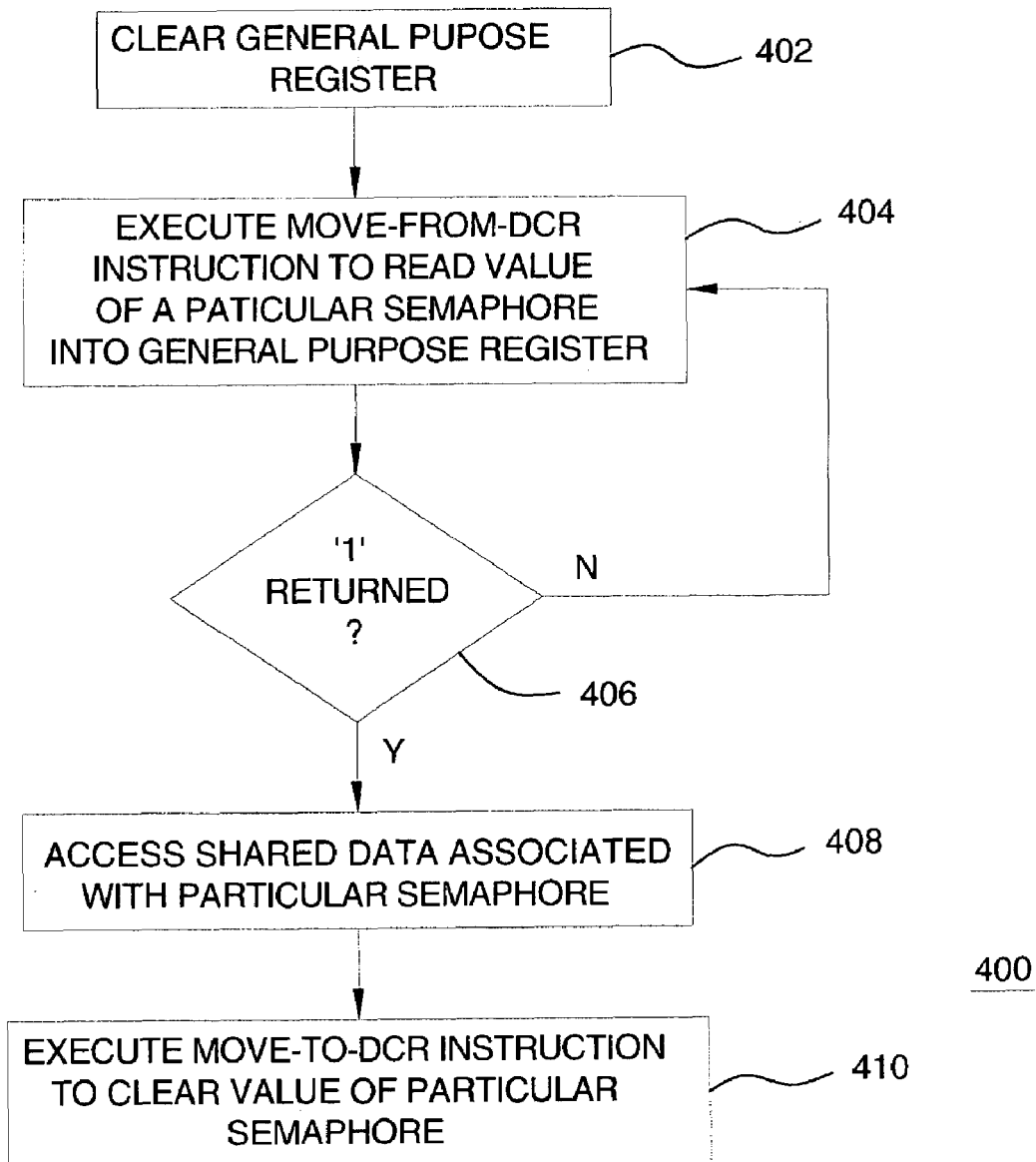
FIG. 4 depicts a flow diagram of an exemplary embodiment of a synchronization process for access to shared memory in a multiprocessor system in accordance with one or more aspects of the invention.

FIG. 4 depicts a flow diagram of an exemplary embodiment of a synchronization process 400 for access to shared memory in a multiprocessor system in accordance with one or more aspects of the invention. Synchronization process 400 may be understood with simultaneous reference to data processing system 100 of FIG. 1. Process 400 begins at step 402, where processor $106_X$ clears a general-purpose register 107. At step 404, processor $106_X$ executes a MOVE-FROM-DCR instruction to read the value of semaphore $105_Y$ into general-purpose register 107. The MOVE-FROM-DCR instruction is a read instruction issued on secondary bus $114_X$ (e.g., a DCR bus). The MOVE-FROM-DCR instruction transfers a piece of data from a register of a DCR bus to a general-purpose register of processor.

At step 406, processor $106_X$ determines if a '1' is stored within general-purpose register 107. Synchronization block 104 returns a '1' only if processor $106_X$ has obtained a lock to shared data associated with semaphore $105_Y$. If the MOVE-FROM-DCR instruction is not acknowledged by synchronization block 104, the MOVE-FROM-DCR instruction will time out and act as a NO-OPERATION (NOOP) instruction. No data will be transferred from synchronization block 104 and general-purpose register 107, which avoids adding acknowledgement traffic on the DCR bus. Alternatively, synchronization block 104 may acknowledge the MOVE-FROM-DCR instruction that does not result in a lock to the shared data segment and return a '0', which avoids one or more processors 106 waiting to time out prior to issuing another read instruction.

If general-purpose register 107 contains a '1', process 400 proceeds to step 408. Otherwise, process 400 proceeds to step 404 and re-executes a MOVE-FROM-DCR instruction. At step 408, processor $106_X$ accesses the shared data segment associated with semaphore $105_Y$ via main bus $116_X$. At step 410, processor $106_X$ executes a MOVE-TO-DCR instruction to clear the value of semaphore $105_Y$. The MOVE-TO-DCR instruction is a write instruction issued on secondary bus $114_X$ (e.g., a DCR bus). The MOVE-TO-DCR instruction transfers a piece of data from a general-purpose register 107 within processor $106_X$ to a register on a DCR bus.

In process 400, a processor 106 that does not obtain a lock to a shared data segment associated with a particular semaphore will spin-wait until such a processor 106 acquires a lock. Since MOVE-FROM-DCR instructions are through DCR bus 114, rather than main bus 116, such instructions do not contribute to traffic on another bus other than bus 114, including main bus 116. As such, a processor 106 that is spin-waiting does not cause any additional traffic on main bus 116. This is in contrast to a synchronization mechanism where semaphores are stored within shared memory coupled through a main bus, where a spin-waiting processor will continually issue instructions on such a main bus. Accordingly, by coupling spin-waiting through secondary bus 114 and not through main bus 116, main bus 116 has more bandwidth availability for communication between processors 106 and shared memory 112 for enhanced performance of data processing system 102.

Figure 5:
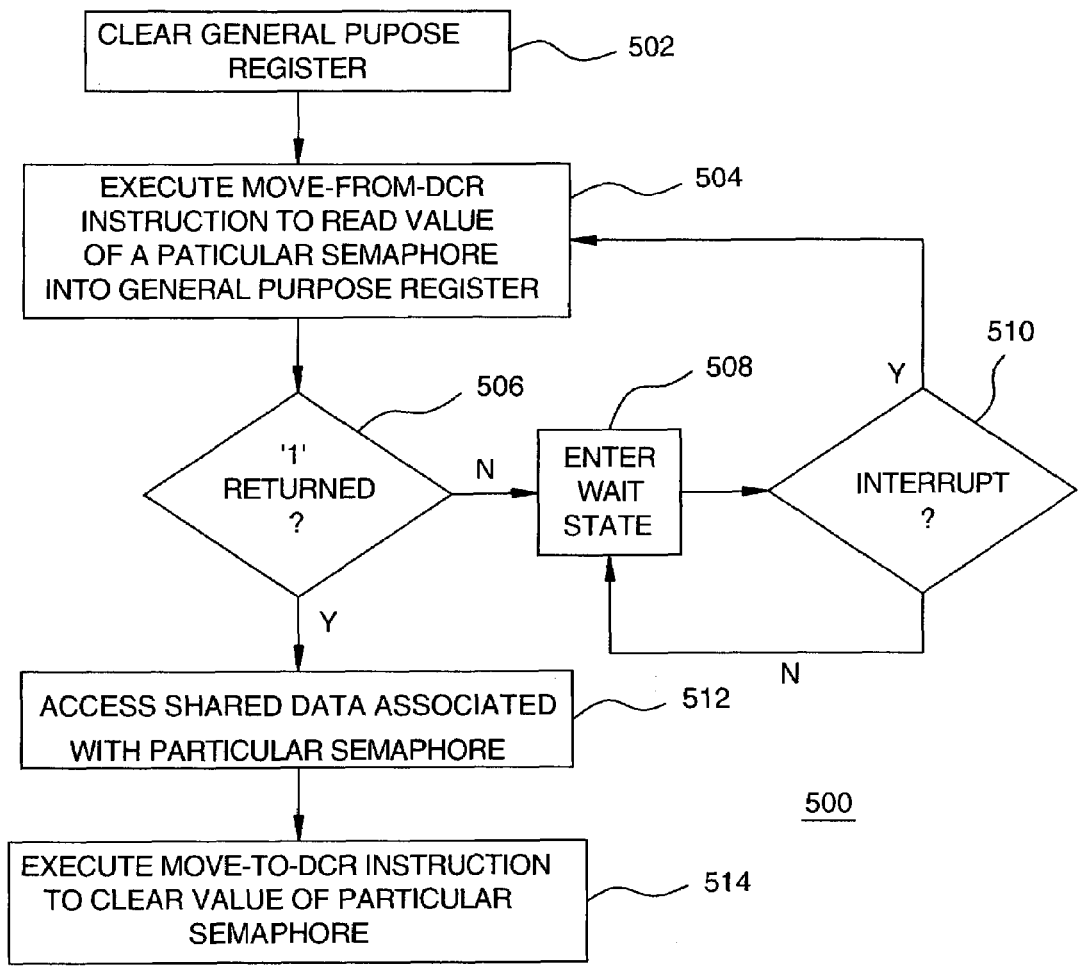
FIG. 5 depicts a flow diagram of another exemplary embodiment of a synchronization process for access to shared memory in a multiprocessor system in accordance with one or more aspects of the invention.

Although synchronization process 400 does not contribute additional traffic on main bus 116, a blocked processor 106 may be put into a wait mode until such time as a lock on a target shared data segment becomes available. FIG. 5 depicts a flow diagram of another exemplary embodiment of a synchronization process 500 for access to shared memory in a multiprocessor system in accordance with one or more aspects of the invention. FIG. 5 may be understood with simultaneous reference to data processing system 100 of FIG. 1. Process 500 begins at step 502, where processor $106_X$ clears a general-purpose register 107. At step 504, processor $106_X$ executes a MOVE-FROM-DCR instruction to read the value of semaphore $105_Y$ into general-purpose register 107.

At step 506, processor $106_X$ determines if a '1' is stored within general-purpose register 107. Synchronization block 104 returns a '1' if processor $106_X$ has obtained a lock to shared data associated with semaphore $105_Y$. If the MOVE-FROM-DCR instruction is not acknowledged by synchronization block 104, the MOVE-FROM-DCR instruction will time out and act as a NO-OPERATION (NOOP) instruction. No data will be transferred from synchronization block 104 to general-purpose register 107, which avoids unnecessary traffic on DCR bus 114. Alternatively, synchronization block 104 may acknowledge the MOVE-FROM-DCR instruction that does not result in a lock to the shared data segment and return a '0', which avoids one or more processors 106 waiting to time out prior to issuing another read instruction.

If general-purpose register 107 contains a '1', process 500 proceeds to step 512. Otherwise, process 500 proceeds to step 508. At step 508, processor $106_X$ enters a wait state. At step 510, process 500 determines if an interrupt has been received. As described above, synchronization block 104 may send an interrupt signal to processor $106_X$ when a lock for semaphore $105_Y$ becomes available. If an interrupt is received, process 500 proceeds to step 504, where a MOVE-FROM-DCR instruction is re-executed by processor $106_X$. If an interrupt is not received, process 500 returns to step 508. This may avoid one or more additional issuances of read instruction by a processor 106, thereby enhancing processor availability while reducing traffic on DCR bus 114.

At step 512, processor $106_X$ accesses a targeted shared data segment associated with semaphore $105_Y$ via main bus 116. At step 514, processor $106_X$ executes a MOVE-TO-DCR instruction to clear the value of semaphore $105_Y$. By using the interrupt scheme of process 500, there is a power savings by reducing wait time to access the shared data segment.

Again, it should be appreciated that secondary bus 114 need not be a DCR bus. Thus, synchronization block 104 may include registers for storing values described above with respect to a register of secondary bus 114, as described below in additional detail.

Figure 2:
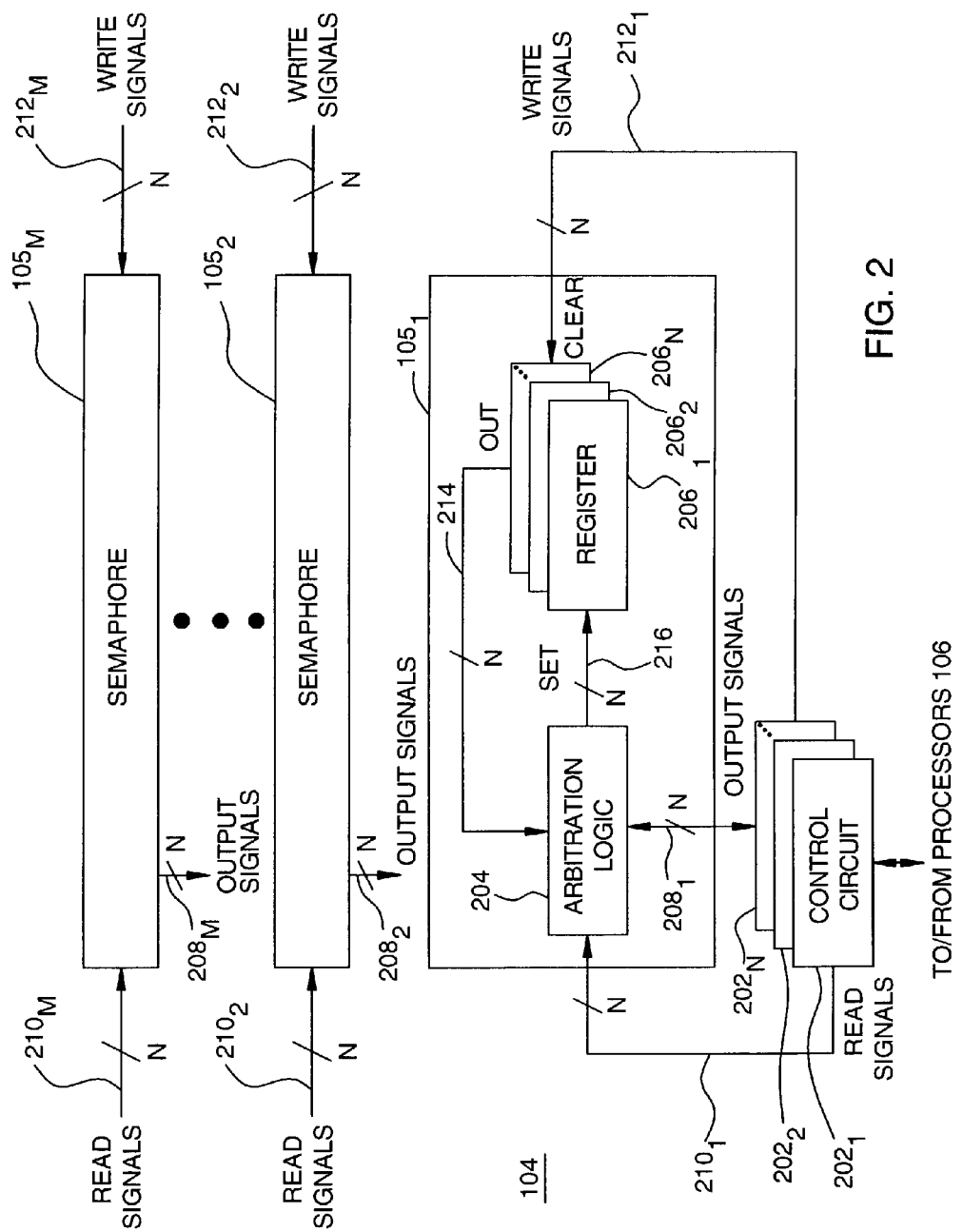
FIG. 2 depicts a high-level block diagram of an exemplary of a synchronization block in accordance with one or more aspects of the invention.

FIG. 2 depicts a high-level block diagram of an exemplary of a synchronization block 104 in accordance with one or more aspects of the invention. Elements of FIG. 2 that are the same or similar to elements of FIG. 1 are designated with identical reference-numerals. Synchronization block 104 includes a plurality of control circuits $202_1$ through $202_N$ (collectively referred to as control circuits 202) and semaphores $105_1$ through $105_M$. Each of semaphores 105 includes a read input bus 210, a write input bus 212, an output bus 208, arbitration logic 204, and a plurality of registers $206_1$ through $206_N$ (collectively referred to as registers 206). In an embodiment, registers 206 are device control registers (DCRs). For clarity, only semaphore $105_1$ of semaphores $105_1$ through $105_M$ is shown in detail.

Each of control circuits $202_1$ through $202_N$ is coupled to arbitration logic 204 via input bus $210_1$. Arbitration logic 204 is coupled to a set input of each of registers $210_1$ through $210_N$ via a set bus 216. An output of each of registers $210_1$ through $210_N$ is coupled to arbitration logic 204 via an output bus 214. Arbitration logic 204 is coupled to each of control circuits $202_1$ through $202_N$ via output bus $208_1$. In addition, control circuits $202_1$ through $202_N$ are respectively coupled to clear inputs of registers $206_1$ through $206_N$ via input bus $212_1$. Control circuits 202 receive input from, and provide output to, processors 106 via secondary bus 114. Control circuits 202 are similarly coupled to semaphores $105_2$ through $105_M$ via input buses $210_2$ through $210_M$, input buses $212_2$ through $212_M$, and output buses $208_2$ through $208_M$.

Control circuits ("controllers") $202_1$ through $202_N$ are respectively associated with processors $106_1$ through $106_N$. Registers $206_1$ through $206_N$ are also respectively associated with processors $106_1$ through $106_N$. Operation of synchronization block 104 is now described with reference to processor $106_X$ that requires access to a shared data segment associated with semaphore $105_Y$, where X is an integer between 1 and N, and Y is an integer between 1 and M. Processor $106_X$ sends a read instruction to control circuit ("controller") $202_X$ to determine whether the shared data segment is unlocked. Controller $202_X$ sends a read signal to arbitration logic 204 via input bus $210_Y$. Other ones of control circuits 202, namely, at least one other control circuit 202 other than controller $202_X$, may also be sending read signals to arbitration logic 204 via input bus $210_Y$ in accordance with read instructions from other ones of processors 106, namely, at least one other processor 106 other than controller $106_X$.

Arbitration logic 204 determines whether one of registers 206 is set using output signals on output bus 214. If all of registers 206 are clear (i.e., the output value of each of registers 206 is '0'), then the shared data segment associated with semaphore $105_Y$ is unlocked. If one of registers 206 is set (i.e., the output value of one of registers 206 is '1'), then the shared data segment associated with semaphore $105_Y$ is locked. If arbitration logic 204 determines that the shared data segment is unlocked, arbitration logic 204 sets register $206_X$ using a set signal on set bus 216. Arbitration logic 204 sends an output signal via output bus $208_Y$ to control circuit $202_X$ indicating that the shared data segment has been locked. Control circuit $202_X$ then returns a '1' to processor $106_X$, indicating that the data segment has been locked.

Processor $106_X$ may now update the shared data segment as necessary. When processor $106_X$ is finished with the data segment, processor $106_X$ sends a write instruction to controller $202_X$ to unlock the data segment. Controller $202_X$ in turn sends a write signal to register $206_X$ over input bus $212_Y$ to clear register $206_X$ (i.e., set the value of register $206_X$ to '0'). Since there is a separate one of registers 206 for each of processors 106, only processor $106_X$ associated with register $206_X$ can clear register $206_X$.

If arbitration logic 204 instead determines that the shared data segment is locked, arbitration logic 204 sends an output signal via output bus $208_Y$ to control circuit $202_X$ indicating that the shared data segment is already locked by another one of processors 106. In an embodiment, control circuit $202_X$ does not return a value to processor $106_X$ and the read instruction sent by processor $106_X$ times out. Alternatively, control circuit $202_X$ may return a '0' to processor $106_X$, indicating that the data segment has already been locked by another of processors 106.

As noted above, other ones of control circuits 202 in addition to control circuit $202_X$ may also be sending read signals to arbitration logic 204. When multiple read signals are sent to arbitration logic 204 at the same time and none of registers 206 are set (i.e., the shared data segment is unlocked), arbitration logic 204 executes an algorithm to determine which of processors 106 will obtain a lock to the shared data segment. Examples of arbitration algorithms include arbitrating based on fixed priorities assigned to processors 106 or arbitrating based on a round-robin priority assignment for processors 106 or other well-known arbitration algorithms, individually or in combination.

Figure 3:
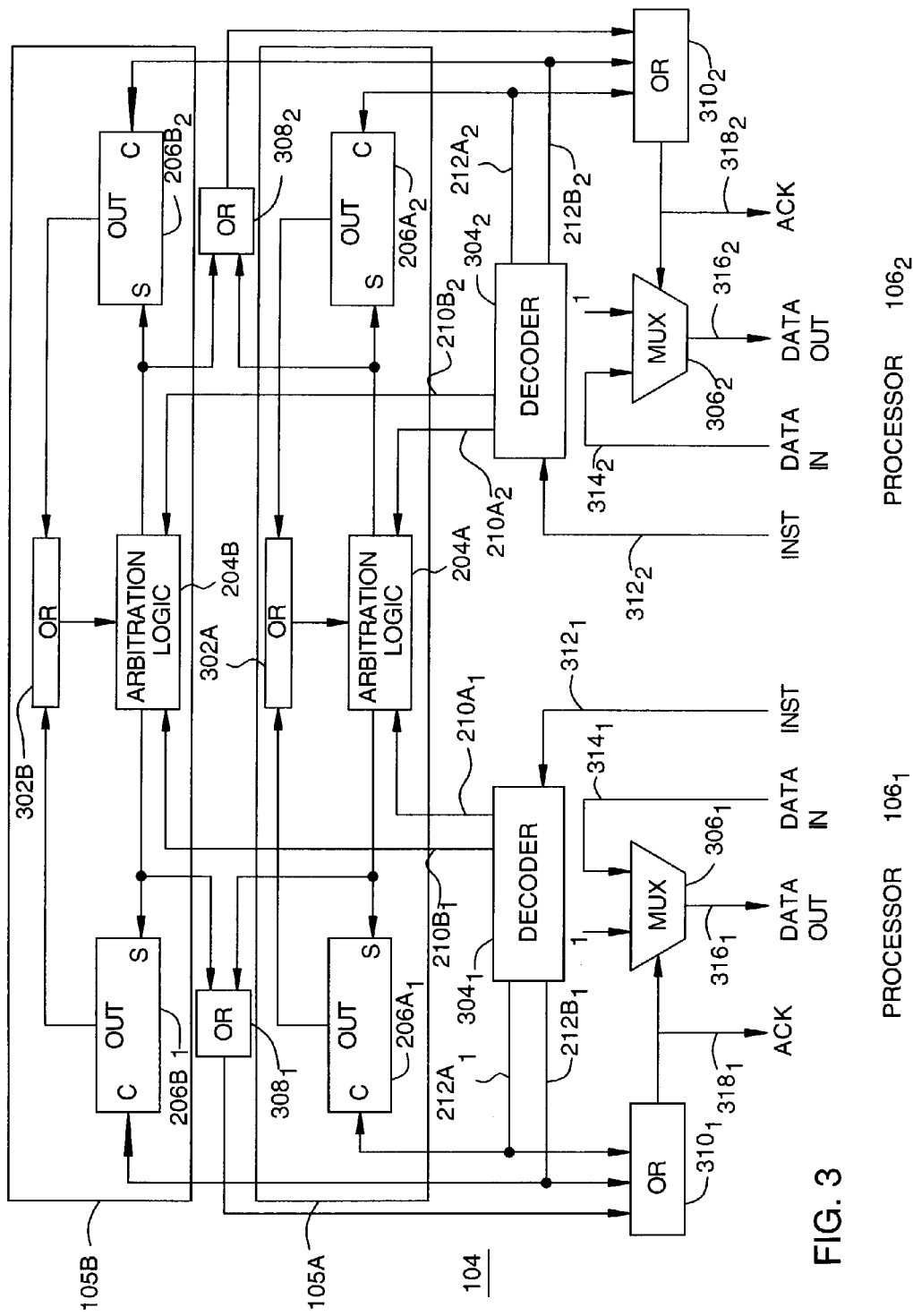
FIG. 3 depicts a lower-level block diagram of an exemplary embodiment of a portion of the synchronization block of FIG. 2 in accordance with one or more aspects of the invention.

FIG. 3 depicts a lower-level block diagram of an exemplary embodiment of a portion of the synchronization block 104 of FIG. 2 in accordance with one or more aspects of the invention. Elements in FIG. 3 that are the same or similar to elements of FIG. 2 are designated with the same or similar reference numerals and are described in detail above. In this embodiment, synchronization block 104 is coupled to processors $106_1$ and $106_2$, and includes two semaphores 105A and 105B. Reference numerals including the designation 'A' correspond to semaphore 105A, and reference numerals including the designation 'B' correspond to semaphore 105B. Reference numerals including the subscript '1' correspond to processor $106_1$, and reference numerals including the subscript '2' correspond to processor $106_2$.

Synchronization block 104 includes instruction inputs $312_1$ and $312_2$, data inputs $314_1$ and $314_2$, data outputs $316_1$ and $316_2$, and acknowledgement outputs $318_1$ and $318_2$. Semaphore 105A includes register $206A_1$, register $206A_2$, arbitration logic 204A, and an OR gate 302A. Semaphore 105B includes register $206B_1$, register $206B_2$, arbitration logic 204B, and an OR gate 302B. Control circuit $202_1$ for processor $106_1$ includes a decoder $304_1$, a multiplexer $306_1$, an OR gate $308_1$, and an OR gate $310_1$. Control circuit $202_2$ for processor $106_2$ includes a decoder $304_2$ a multiplexer $306_2$, an OR gate $308_2$, and an OR gate $310_2$.

Arbitration logic 204A is respectively coupled to set terminals of register $206A_1$ and register $206A_2$. Outputs of register $206A_1$ and register $206A_2$ are respectively coupled to inputs of OR gate 302A. Output of OR gate 302A is coupled to arbitration logic 204A. Likewise, arbitration logic 204B is respectively coupled to set terminals of register 206B$_1$ and register 206B$_2$. Outputs of register 206B$_1$ and register 206B$_2$ are respectively coupled to inputs of OR gate 302B. Output of OR gate 302B is coupled to arbitration logic 204B.

Decoder 304$_1$ is respectively coupled to arbitration logic 204A and arbitration logic 204B via read bus 210A$_1$ and 210B$_1$. Decoder 304$_1$ is respectively coupled to clear terminals of register 206A$_1$ and register 206B$_1$ via write bus 212A$_1$ and write bus 212B$_1$. Decoder 304$_1$ is also coupled to instruction input 312$_1$. Likewise, decoder 304$_2$ is respectively coupled to arbitration logic 204A and arbitration logic 204B via read bus 210A$_2$ and read bus 210B$_2$. Decoder 304$_2$ is respectively coupled to clear terminals of register 206A$_2$ and register 206B$_2$ via write bus 212A$_2$ and write bus 212B$_2$. Decoder 304$_2$ is also coupled to instruction input 312$_2$.

Inputs of OR gate 308$_1$ are respectively coupled to set terminals of register 206A$_1$ and register 206B$_1$. Inputs of OR gate 310$_1$ are respectively coupled to an output of OR gate 308$_1$, write bus 212A$_1$, and write bus 212B$_1$. An output of OR gate 310$_1$ is coupled to a control terminal of multiplexer 306$_1$ and acknowledge output 318$_1$. Inputs of multiplexer 306$_1$ are respectively coupled to a '1' and data input 314$_1$. An output of multiplexer 306$_1$ is coupled to data output 316$_1$. Likewise, inputs of OR gate 308$_2$ are respectively coupled to set terminals of register 206A$_2$ and register 206B$_2$. Inputs of OR gate 310$_2$ are respectively coupled to an output of OR gate 308$_2$, write bus 212A$_2$, and write bus 212B$_2$. An output of OR gate 310$_2$ is coupled to a control terminal of multiplexer 306$_2$ and acknowledge output 318$_2$. Inputs of multiplexer 306$_2$ are respectively coupled to a '1' and data input 314$_2$. An output of multiplexer 306$_2$ is coupled to data output 316$_2$.

Operation of synchronization block 104 is now described with reference to processor 106$_1$. As operation of processor 106$_2$ is identical to that of processor 106$_1$, description of operation of processor 106$_2$ is limited to avoid repetition. An instruction from processors 106$_1$ is coupled to instruction input 312$_1$. Decoder 304$_1$ determines if the instruction is addressed to synchronization block 104. For example, other devices may be coupled to secondary bus 114 and the instruction may be addressed to such other devices. If the instruction is addressed to synchronization block 104, decoder 304$_1$ determines if the instruction is a read instruction or a write instruction, and determines whether the instruction relates to semaphore 105A or semaphore 105B. In response to a read instruction, decoder 304$_1$ sends a read signal to arbitration logic 204A or arbitration logic 204B. In response to a write instruction, decoder 304$_1$ sends a clear signal to register 206A$_1$ or register 206B$_1$.

OR gate 302A performs a logical OR operation on output from registers 206A$_1$ and 206A$_2$. Arbitration logic 204A uses output from OR gate 302A to determine if any of registers 206A$_1$ or 206A$_2$ are set. OR gate 302B performs a logical OR operation on output from registers 206B$_1$ and 206B$_2$. Arbitration logic 204B uses output from OR gate 302B to determine if any of registers 206B$_1$ or 206B$_2$ are set. Operation of arbitration logic 204 is described above with respect to FIG. 2. OR gates 308$_1$ and 310$_1$ are used to send acknowledge signals to processor 106$_1$ and to send a control signal to multiplexer 306$_1$. Multiplexer 306$_1$ outputs a '1' if processor 106$_1$ locks access to shared data related to either semaphore 105A or semaphore 105B. If processor 106$_1$ does not obtain the lock, acknowledge signal 318$_1$ will not be asserted and the DCR operation will time out. Input data terminal 314$_1$ is used when other devices are daisy-chained to synchronization block 105 on the DCR bus. If processor 106$_1$ performs a write operation to a device other than synchronization block 105, acknowledge signal 318$_1$ is not asserted and multiplexer 306$_1$ passes the data on input data terminal 314$_1$ to the next device.

Figure 6:
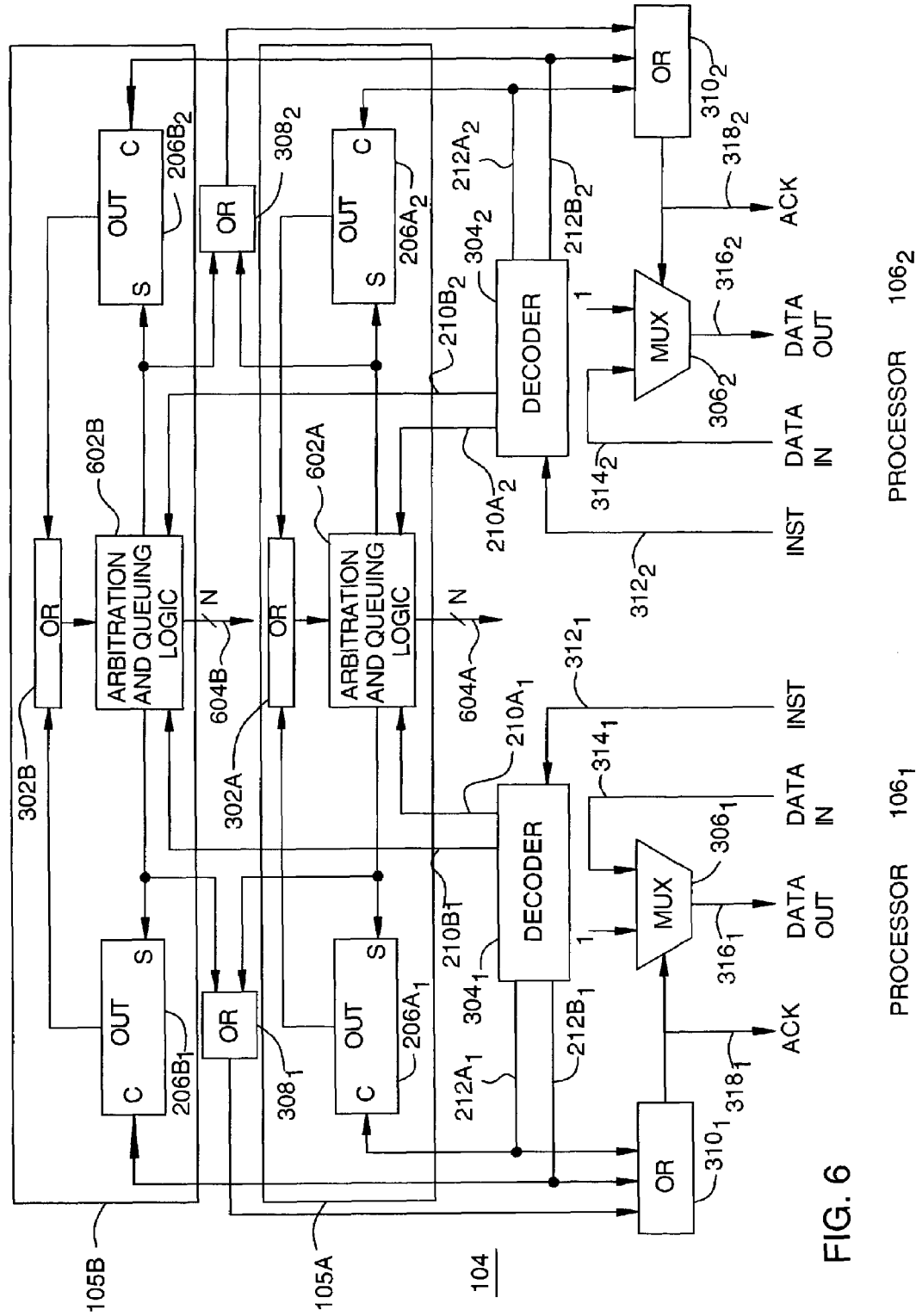
FIG. 6 depicts a lower-level block diagram of another exemplary embodiment of a portion of the synchronization block of FIG. 2 in accordance with one or more aspects of the invention.

FIG. 6 depicts a lower-level block diagram of another exemplary embodiment of a portion of the synchronization block 104 of FIG. 2 in accordance with one or more aspects of the invention. Elements of FIG. 6 that are the same or similar to elements shown in FIGS. 2 and 3 are designated with identical reference numerals and are described in detail above. In this embodiment, queuing logic is added to arbitration logic 204A and arbitration logic 204B. Synchronization block 104 includes arbitration and queuing logic 602A, arbitration and queuing logic 602B, interrupt bus 604A, and interrupt bus 604B. Interrupt buses 604A and 604B are respectively coupled to arbitration and queuing logic 602A and 602B.

As described above with respect to FIG. 5, a processor may enter a wait state if a lock to a targeted shared data segment is not free. Synchronization block 104 stores the tag of a processor that attempted to lock access to a particular segment of shared data but was blocked due to another processor having already locked access to that segment of shared data. The tag of the block processor is stored within arbitration and queuing logic 602A and 602B for each of semaphores 105A and 105B, respectively.

For example, processor 106$_1$ may have already locked access to shared data associated with semaphore 105A. Processor 106$_2$ may have requested access to the shared data associated with semaphore 105A but was blocked. The tag of processor 106$_2$ is stored within arbitration and queuing logic 602A. Clear terminals of each of registers 206A$_1$ and 206A$_2$ are coupled to arbitration and queuing logic 602A. Thus, when processor 106$_1$ is finished with the shared data and causes register 206A$_1$ to be cleared, arbitration and queuing logic 602A sends an interrupt signal via interrupt bus 604A to processor 106$_2$.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. An apparatus for synchronizing access to a memory shared among a plurality of processors, each of the plurality of processors having a primary bus for communicating with the memory and a secondary bus, the apparatus comprising:
   a synchronization block coupled to the secondary bus of each of the plurality of processors, at least a portion of the plurality of processors not capable of supporting a read-modify-write single instruction to the memory, the synchronization block having at least one semaphore for controlling access among the plurality of processors to at least one data segment stored within the memory;
   the at least one semaphore being configured to control access among the plurality of processors to the at least one data segment stored within the memory; the plurality of processors coupled between the synchronization block and the memory;
   wherein access to and from the at least one semaphore by the plurality of processors is via the secondary bus and access to and from the memory by the plurality of processors is via the primary bus, the synchronization block, the plurality of processors, and the memory being coupled in series wherein traffic for the secondary bus does not contribute to traffic on the primary bus;

wherein the at least one semaphore comprises a plurality of registers, each of the plurality of registers having a set terminal, a clear terminal and an output terminal and an arbitration circuit coupled to the set terminal and the output terminal of each of the plurality of registers;

wherein the synchronization block further comprises a plurality of controllers, each of the plurality of controllers respectively coupled to the secondary bus, the clear terminal and the arbitration circuit; and wherein each of the plurality of controllers comprises a decoder to provide read requests to the arbitration circuit and write requests to the clear terminal of a respective one of the plurality of registers in response to instructions from a respective one of the plurality of processors.

2. The apparatus of claim 1, wherein the arbitration circuit controllably sets one of the plurality of registers in at least partial response to a read request provided by one of the plurality of processors.

3. The apparatus of claim 1, wherein the arbitration circuit includes queuing logic for queuing read requests provided by the plurality of processors.

4. The apparatus of claim 1, wherein the secondary bus of each of the plurality of processors is a device control register bus.

5. A data processing system, comprising:

a plurality of processors, each of the plurality of processors including a primary bus and a secondary bus, at least a portion of the plurality of processors not capable of supporting a read-modify-write single instruction to memory;

the memory coupled to the primary bus of each of the plurality of processors;

a synchronization block coupled to the secondary bus of each of the plurality of processors, the synchronization block having at least one semaphore for controlling access among the plurality of processors to the memory; and the plurality of processors coupled between the synchronization block and the memory;

wherein access to and from the at least one semaphore by the plurality of processors is via the secondary bus and access to and from the memory by the plurality of processors is via the primary bus, the synchronization block, the plurality of processors, and the memory being coupled in series wherein traffic for the secondary bus does not contribute to traffic on the primary bus;

wherein the at least one semaphore comprises a plurality of registers, each of the plurality of registers having a set terminal, a clear terminal and an output terminal and an arbitration circuit coupled to the set terminal and the output terminal of each of the plurality of registers;

wherein the synchronization block further comprises a plurality of controllers, each of the plurality of controllers respectively coupled to the secondary bus, the clear terminal and the arbitration circuit; and wherein each of the plurality of controllers comprises a decoder to provide read requests to the arbitration circuit and write requests to the clear terminal of a respective one of the plurality of registers in response to instructions from a respective one of the plurality of processors.

6. The data processing system of claim 5, wherein the arbitration circuit controllably sets one of the plurality of registers in at least partial response to a read request provided by one of the plurality of processors.

7. The data processing system of claim 5, wherein the arbitration circuit includes queuing logic for queuing read requests provided by the plurality of processors.

8. The data processing system of claim 5, wherein the secondary bus of each of the plurality of processors is a device control register bus.

9. The data processing system of claim 5, wherein the plurality of processors are embedded within a programmable logic device.

10. The data processing system of claim 9, wherein the synchronization block is formed with programmed configurable logic blocks within the programmable logic device.

11. The data processing system of claim 5, wherein the at least one semaphore controls access among the plurality of processors at least one data segment stored within the memory.

12. A method of synchronizing access to a memory shared among a plurality of processors, each of the plurality of processors having a primary bus for communicating with the memory and a secondary bus, the method comprising:

providing at least one semaphore;

providing access to the at least one semaphore via the secondary bus of each of the plurality of processors;

determining a state of the at least one semaphore;

controlling access among the plurality of processors to at least one data segment stored within the memory in response to the state of the at least one semaphore, at least a portion of the plurality of processors not capable of supporting a read-modify-write single instruction to the memory;

the at least one semaphore being configured to control access among the plurality of processors to the at least one data segment stored within the memory; and the plurality of processors coupled between a synchronization block in which the at least one semaphore is located and the memory;

wherein access to and from the at least one semaphore by the plurality of processors is via the secondary bus and access to and from the memory by the plurality of processors is via the primary bus, the synchronization block, the plurality of processors, and the memory being coupled in series wherein traffic for the secondary bus does not contribute to traffic on the primary bus;

wherein the at least one semaphore comprises a plurality of registers, each of the plurality of registers having a set terminal, a clear terminal and an output terminal and an arbitration circuit coupled to the set terminal and the output terminal of each of the plurality of registers;

wherein controlling access comprises allowing one of the plurality of processors to access the at least one data segment if the state of the at least one semaphore is a first value and blocking access by others of the plurality of processors to the at least one data segment if the state of the at least one semaphore is a second value wherein the synchronization block further comprises a plurality of controllers, each of the plurality of controllers respectively coupled to the secondary bus, the clear terminal and the arbitration circuit; and wherein each of the plurality of controllers comprises a decoder to provide read requests to the arbitration circuit and write requests to the clear terminal of a respective one of the plurality of registers in response to instructions from a respective one of the plurality of processors.

13. The method of claim 12, wherein the step of determining the state comprises reading the state of the at least one semaphore into a register within one of the plurality of processors.

14. A method of synchronizing access to a memory shared among a plurality of processors, each of the plurality of processors having a primary bus and a secondary bus, the primary bus for communicating with the memory, the method comprising:
- providing a semaphore, the semaphore comprising a plurality of registers, each of the plurality of resisters having a set terminal, a clear terminal and an output terminal and an arbitration circuit coupled to the set terminal and the output terminal of each of the plurality of registers;
- reading a state of the semaphore via the secondary bus by one of the plurality of processors;
- locking shared data stored in the memory by blocking access to at least one address range associated with the shared data stored in the memory to others of the plurality of processors if the state of the semaphore indicates the memory is not locked;
- the plurality of processors coupled between a synchronization block in which the semaphore is located and the memory, at least a portion of the plurality of processors not capable of supporting a read-modify-write single instruction to the memory;
- wherein access to and from the semaphore by the plurality of processors is via the secondary bus and access to and from the memory by the plurality of processors is via the primary bus, the synchronization block, the plurality of processors, and the memory being coupled in series wherein traffic for the secondary bus does not contribute to traffic on the primary bus;
- wherein the synchronization block further comprises a plurality of controllers, each of the plurality of controllers respectively coupled to the secondary bus, the clear terminal and the arbitration circuit; and
- wherein each of the plurality of controllers comprises a decoder to provide read requests to the arbitration circuit and write requests to the clear terminal of a respective one of the plurality of registers in response to instructions from a respective one of the plurality of processors.

15. The method of claim 14, further comprising repeating the step of reading if the state of the semaphore indicates the memory is locked.

16. The method of claim 14, wherein the step of reading the state comprises:
- transmitting a read request to the semaphore;
- receiving a first value of the state of the semaphore that indicates the memory is locked;
- re-transmitting the read request to the semaphore; and
- receiving a second value of the state of the semaphore that indicates the memory is unlocked.

17. The method of claim 14, wherein the step of reading the state comprises;
- transmitting a read request to the semaphore; and
- receiving a value of the state of the semaphore that indicates the memory is unlocked.

18. The method of claim 17, wherein the step of reading is repeated if the read request times out.

19. The method of claim 14, further comprising:
- accessing the memory via the primary bus by the one of the plurality of processors; and
- unlocking the memory by allowing access to the memory to the others of the plurality of processors.

20. The method of claim 19, wherein the step of unlocking comprises:
- transmitting a write request to the semaphore; and
- storing a value in the semaphore indicating the memory is unlocked.

21. The method of claim 14, further comprising causing the one of the plurality of processors to be in a wait condition if the state of the semaphore indicates the memory is locked.

22. The method of claim 21, wherein the step of reading the state comprises:
- transmitting a read request to the semaphore;
- receiving a first value of the state of the semaphore that indicates the memory is locked; and
- receiving a second value of the state of the semaphore that Indicates the memory is unlocked.

23. The method of claim 21, wherein the step of reading the state comprises;
- transmitting a read request to the semaphore; and
- receiving a value of the state of the semaphore that indicates the memory is unlocked.

24. The method of claim 23, wherein the one of the plurality of processors enters the wait condition if the read request times out.

25. The method of claim 21, further comprising causing the one of the plurality of processors to exit the wait condition if the state of the semaphore indicates the memory is unlocked.

26. The method of claim 21, further comprising:
- accessing the memory via the primary bus of the one of the plurality of processors; and
- unlocking the memory by allowing access to the memory by others of the plurality of processors.

27. The method of claim 26, wherein the step of unlocking comprises;
- transmitting a write request to the semaphore; and
- storing a value in the semaphore indicating the memory is unlocked.

* * * * *